US011132237B2

(12) United States Patent
Cable et al.

(10) Patent No.: US 11,132,237 B2
(45) Date of Patent: Sep. 28, 2021

(54) SYSTEM AND METHOD FOR USAGE-BASED APPLICATION LICENSING IN A HYPERVISOR VIRTUAL EXECUTION ENVIRONMENT

(75) Inventors: Laurence P. G. Cable, San Francisco, CA (US); Michael Piech, San Francisco, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 151 days.

(21) Appl. No.: 12/566,380

(22) Filed: Sep. 24, 2009

(65) Prior Publication Data

US 2011/0072431 A1    Mar. 24, 2011

(51) Int. Cl.
*G06F 9/50* (2006.01)
*G06F 21/10* (2013.01)

(52) U.S. Cl.
CPC ............ *G06F 9/5077* (2013.01); *G06F 21/10* (2013.01)

(58) Field of Classification Search
CPC ............................... G06F 21/10; G06F 9/5077
(Continued)

(56) References Cited

U.S. PATENT DOCUMENTS 7,096,469 B1 * 8/2006 Kubala et al. ............... 718/100
7,765,545 B2 * 7/2010 Uchishiba et al. ............. 718/1
(Continued)

FOREIGN PATENT DOCUMENTS

CN    101425022 A    5/2009
CN    102511034      6/2012
(Continued)

OTHER PUBLICATIONS

L. Wang et al, "Schedule Distributed Virtual Machines in a Service Oriented Environment," Proceedings of the 24th IEEE International Conference on Advanced Information Networking and Applications. Retrieved Jul. 3, 21 from: <https://dialog.proquest.com/professional/docview/846705658?accountid=131444.> (Year: 2010).*
(Continued)

*Primary Examiner* — Abhishek Vyas
*Assistant Examiner* — Monica A Mandel
(74) *Attorney, Agent, or Firm* — Tucker Ellis LLP

(57) ABSTRACT

A system and method for usage-based application licensing in a hypervisor virtual execution environment. In accordance with an embodiment, the system comprises one or more computers, each with a hypervisor operating thereon and forming a hypervisor environment, together with one or more virtual machine images executing within that hypervisor environment. Each hypervisor aggregates usage statistics by each image instance for physical resources, and reports the statistics to a management framework. The management framework uses the statistics to ensure the system is adequately licensed with usage units. An initial allocation of usage units is recorded in the image and accessed during execution by the hypervisor. As the usage units near expiration, the hypervisor can signal that a particular image is about to become unlicensed. The management framework can then either allocate more usage units, shut down the image, or audit the unlicensed usage for later compensation.

20 Claims, 6 Drawing Sheets

(58) Field of Classification Search
USPC .......................................................... 705/59
See application file for complete search history.

(56) References Cited

U.S. PATENT DOCUMENTS

| | | | |
|---|---|---|---|
| 7,941,803 B2* | 5/2011 | Armstrong et al. ............... | 718/1 |
| 8,112,527 B2 | 2/2012 | Kawato | |
| 8,396,807 B1* | 3/2013 | Yemini .................. | G06Q 10/06 705/400 |
| 2005/0192099 A1* | 9/2005 | Nguyen .................. | G06F 21/10 463/42 |
| 2006/0004667 A1 | 1/2006 | Neil | |
| 2007/0028052 A1* | 2/2007 | Armstrong et al. ........... | 711/129 |
| 2007/0050763 A1 | 3/2007 | Kagan | |
| 2008/0028397 A1* | 1/2008 | Gupta et al. ...................... | 718/1 |
| 2008/0163210 A1 | 7/2008 | Bowman et al. | |
| 2009/0006868 A1* | 1/2009 | Alkove et al. ................ | 713/193 |
| 2009/0113422 A1 | 4/2009 | Kani | |
| 2009/0164356 A1* | 6/2009 | Bakman .................. | G06Q 30/02 705/34 |
| 2009/0216707 A1* | 8/2009 | Keohane ............. | G06F 16/1737 |
| 2009/0217263 A1* | 8/2009 | Gebhart et al. .................... | 718/1 |
| 2009/0276771 A1* | 11/2009 | Nickolov et al. ............. | 717/177 |
| 2009/0292654 A1* | 11/2009 | Katiyar et al. ................. | 705/412 |
| 2009/0328056 A1* | 12/2009 | McCune et al. .............. | 718/105 |
| 2010/0070970 A1* | 3/2010 | Hu et al. ........................... | 718/1 |
| 2010/0083252 A1* | 4/2010 | Eide et al. ..................... | 718/100 |
| 2010/0162238 A1* | 6/2010 | Warfield ........................... | 718/1 |
| 2010/0205303 A1* | 8/2010 | Chaturvedi et al. .......... | 709/226 |
| 2010/0281083 A1* | 11/2010 | Purtell, II ............. | G06F 16/122 707/822 |
| 2011/0071983 A1* | 3/2011 | Murase ......................... | 707/649 |

FOREIGN PATENT DOCUMENTS

| | | |
|---|---|---|
| JP | 2002024192 A | 1/2002 |
| JP | 2001301690 A | 6/2002 |
| JP | 2004171412 A | 6/2004 |
| JP | 2004280200 A | 7/2004 |
| JP | 2006018815 A | 1/2006 |
| JP | 5627690 | 11/2014 |
| KR | 10-2006-0046042 | 5/2006 |
| KR | 101697269 | 1/2017 |
| WO | 2007136021 | 11/2007 |

OTHER PUBLICATIONS

PCT International Search Report in connection with PCT Application No. PCT/US2010/047010 dated Dec. 13, 2010, 8 pages.

Goiri, et al., "Autonomic Resource Management for the Xen Hypervisor", First Workshop on Execution Environments for Distributed Computing, http://citeseerx.ist.psu.edu, Jun. 29, 2007, 8 pages.

Simcox, "Autonomic Features of the IBM Virtualization Engine", http://www.ibm.com/developerworks/auto/nomic/library/ac-ve/, Sep. 14, 2004, 10 pages.

Matthews, et al., "Virtual Machine Contracts for Datacenter and Cloud Computing Environments", ACDC '09 Proceedings of the 1st Workshop on Automated Control for Datacenters and Clouds, http://portal.acm.org/citation.cfm?id=1555278, ACM, Jun. 19, 2009, 6 pages.

Wolf, "Virtualization Licensing and Support Lethargy: Curing the Disease That Stalls Virtualization Adoption", https://upgrade.vmware.com/files/pdf/analysts/Burton-Virtualization-Licensing-Support.pdf, Jan. 22, 2008, 52 pages.

Open Trusted Computing (OpenTC) consortium, "D04.1 Basic Management Interface", 2006; downloaded from http://www.opentc.net/deliverables2006/OTC_D04.1_BMI_V0.1_specification.pdf.

State Intellecutual Property Office of the People's Republic of China, Search Report and Office Action for Chinese Patent Application No. 201080042413.6, dated Apr. 4, 2014.

English translation of Office action issued by Korean Intellectual Property Office for Korean patent application No. 10-2012-7009878, dated Mar. 21, 2016 (5 pages).

Khanna G et al.: "Application Performance Management in Virtualized Server Environments", Network Operations and Management Symposium, 2006. NOMS 2006. 10TH IEEE/IFIP Vancouver, NC, Canada Apr. 3-7, 2006, Piscataway, NJ, USA, IEEE, Apr. 3, 2016, pp. 373-381.

Vishakha Gupta et al.: "GViM", Mar. 31, 2009, HPCVIRT'093RD Workshop on System-Level Virtualization for High Performance Computing, ACM, 2 Penn Plaza, Suite 701 New York, NY 10121-0701 USA, pp. 17-24.

Xiaoyun Zhu et al: "1000 islands: an integrated approach to resource management for virtualized data centers", Cluster Computing, Kluwer Academic Publishers, BO, vol. 12, No. 1, Nov. 1, 2008, pp. 45-57.

Norman Bobroff et al "Dynamic Placement of Virtual Machines for Managing SLA Violations", May 1, 2007, Integrated Network Management, 2007. IM '07. 10th IFIP/IEEE Inter National Symposium on, IEEE, PI, pp. 119-128.

European Patent Office, Summons to attend oral proceedings, mailed Jun. 20, 2017, 6 pages.

European Patent Office, Communication under Rule 71(3), Intention to grant, dated Apr. 30, 2018, 10 pages.

Communication under Rule 71(3) for European Patent Application No. 10752667.5, dated Apr. 30, 2018, 10 pages.

Intellectual Property India, Government of India, "Examination Report under sections 12 & 13 of the Patents Act, 1970 and the Patents Rules, 2003", dated Jun. 27, 2019, 7 pages.

* cited by examiner

SYSTEM AND METHOD FOR USAGE-BASED APPLICATION LICENSING IN A HYPERVISOR VIRTUAL EXECUTION ENVIRONMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The invention is generally related to application servers and virtual machines, and particularly to a system and method for providing usage-based application licensing in a hypervisor or other virtual execution environment.

BACKGROUND

Server virtualization allows a computer system to dynamically optimize utilization of the system's physical resources, for example, the system processor (CPU), memory, input/output (I/O), and networking, by sharing those resources across a number of applications, without changing the applications, and with a high degree of inter-application isolation, resource monitoring, and control. A collection of such computer systems working together is sometimes referred to as a virtual execution environment, or cloud.

Within each of the computer systems in a virtual execution environment, the resource sharing, control, and isolation can be enabled by providing a hypervisor layer between the system's operating system (O/S) and its underlying physical resources. A hypervisor can multiplex the physical resources of the server computer between one or more guest O/S images, creating the illusion that each image has direct and sole access to the resources, and providing isolation between each of the images.

Generally, a hypervisor can be either initially and explicitly configured, and/or continuously controlled to dynamically assign a share of the physical resources based upon the individual requirements of each image, and their current usage thereof. Since the hypervisor appears as a hardware abstraction layer (HAL) to the guest O/S images, control is frequently transferred from the image O/S into the hypervisor during operation (for example due to device interrupts, preemptive scheduling, page faults, context switches, I/O, or networking requests. When frequent transfers of control occur, the hypervisor can multiplex or switch between different images, scheduling or assigning each image its required share of the physical resources as determined at the time of the switch.

One challenge faced by vendors of virtual execution environments, and/or middleware providers who allow their middleware to run in virtualized environments, is to determine which licensing model is best to charge customers or end-user licensees for their usage of virtualized system and middleware resources. Prior to widespread acceptance of server virtualization, a vendor might have charged a per-CPU license fee, allowing an end-user to deploy a licensed application image on a single physical processor, regardless of the actual usage of physical resources by that image. Multi Processor Systems (SMP) may require a license per each CPU in the system. Later, with the advent of multi-core systems (Chip Multi Processing), per-core licensing models have emerged, wherein a fee is charged per core, again independent of usage.

However, because of the dynamic nature of server virtualization, neither of the above models works satisfactorily for both the vendor and the end-user. Although in a particular environment there may be a fixed or maximum number of physical CPUs/cores; virtualization enables an end-user to execute multiple copies of a middleware or application in excess of the maximum number of physical CPUs/cores in that system. Middleware or application vendors would prefer that end-users license each copy of the middleware or application, since in a virtual environment the end user is typically executing, in parallel, multiple copies of the middleware or application, and therefore potentially consuming more of the licensable resource than they would by simply running it directly on the system hardware in a single O/S image.

On the other hand, an end-user would likely prefer not to have to obtain either a per-CPU or per-core license for every virtual copy of the middleware or application, since they may not actually use all of those copies all of the time, nor would such copies be able to consume 100% of the actual physical resources of the deployment platform. Thus, the end-user would generally prefer to license only that amount of middleware or application which they actually use. This is the general area that embodiments of the invention are intended to address.

SUMMARY

Disclosed herein is a system and method for usage-based application licensing in a hypervisor virtual execution environment. In accordance with an embodiment, the system comprises one or more computers, each with a hypervisor operating thereon and forming a hypervisor environment, together with one or more virtual machine images executing within that hypervisor environment. Each hypervisor aggregates usage statistics by each image instance for physical resources, such as processor (CPU), memory, input/output (I/O) and networking, over the lifecycle of a particular image instance, and reports the statistics, continuously, upon request, or at image shutdown/termination, to a management framework. The management framework uses the statistics to ensure the system is adequately licensed with usage units. An initial allocation of usage units is recorded in the image and accessed during execution by the hypervisor. As the usage units near expiration, the hypervisor can signal that a particular image is about to become unlicensed. The management framework can then either allocate more usage units, shut down the image, or audit the unlicensed usage for later compensation.

DETAILED DESCRIPTION

As described above, because of the dynamic nature of server virtualization, none of the currently available licensing models works satisfactorily for both middleware or application vendors and their customers or end-users. Virtualization enables an end-user to execute multiple copies of a middleware or application in excess of the maximum number of physical processors (CPUs/cores) in that system; and as such middleware or application vendors would prefer that end-users license each copy of the middleware or application, since in a virtual environment the end user is typically executing, in parallel, multiple copies of the middleware or application, and therefore potentially consuming more of the licensable resource than they would by simply running it directly on the system hardware in a single operating system (O/S) image. On the other hand, an end-user would likely prefer not to have to obtain either a per-CPU or per-core license for every virtual copy of the middleware or application, since they may not actually use all of those copies all of the time, nor would such copies be able to consume 100% of the actual physical resources of the deployment platform.

Since neither of these models is suitable for both the middleware or application licensor (vendor) and their licensee (end-user), it is desirable to move to a model wherein a virtual execution environment vendor can license their end-users based upon the actual consumption of the licensed resource (such as the middleware or application) by each of the copies that the end-user deploys on a virtualization solution. Described herein is a system and method for enabling such a usage based licensing model, without requiring modification of either the middleware or application, or of the guest O/S upon which it is deployed.

Figure 1:
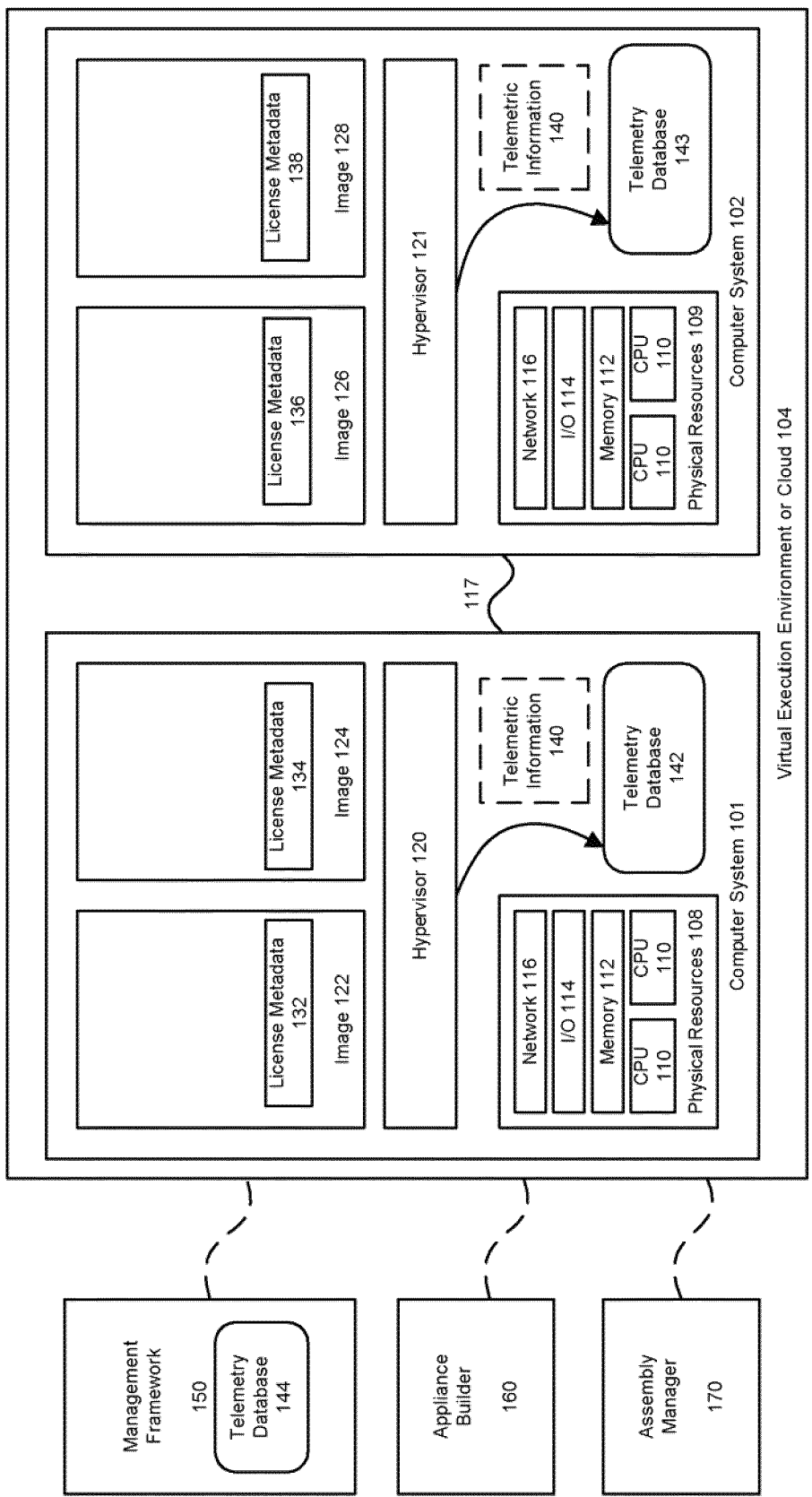
FIG. 1 shows an illustration of a system for usage-based application licensing in a hypervisor or other virtual execution environment, in accordance with an embodiment.

FIG. 1 shows an illustration of a system for usage-based application licensing in a hypervisor or other virtual execution environment, in accordance with an embodiment. As shown in FIG. 1, the system comprises one or more physical computers, computer systems, server computers, or similar computing devices 101, 102, which operate together to provide a virtual execution environment or cloud 104. As further shown in FIG. 1, each computer system includes physical resources 108, 109; such as one or more processors (CPU's) 110, a memory 112, input/output (I/O) 114, and networking resources 116; and is interconnected with the other computer systems via high speed physical networking, the Internet, or a similar communications technology 117. Each computer system also includes a hypervisor 120, 121, which can multiplex the physical resources of that computer system between one or more bootable machine image (BMI) instances 122, 124, 126, 128, that are operating on the computer system, creating the illusion that each image instance has direct and sole access to the resources, and providing isolation between those images.

In accordance with an embodiment, the hypervisor at each computer system collects telemetric information 140, or otherwise aggregates statistics regarding the usage by each particular image instance on that computer system for that system's physical resources, such as its processor, memory, I/O, and networking resources, over the lifecycle of that particular image instance. The hypervisor reports the telemetric information or statistics, either continuously, upon request, or at image shutdown/termination, to a management framework 150. The management framework then uses the statistics to ensure the system is adequately licensed with usage units and/or to provide a means of charging end-users for their usage. In accordance with an embodiment, the system can further comprise one or more of an appliance builder 160, and/or an assembly manager 170, each of which features are described in further detail below.

In accordance with an embodiment, an initial allocation of usage units or credits 132, 134, 136, 138 is recorded as metadata within, or otherwise associated with each image instance in the virtual execution environment for which usage will be licensed. The usage units for a partical instance are subsequently accessed, increased, or depleted during execution of that instance by the hypervisor. Statistical information about the usage can also be recorded in a telemetry database 142, 143, 144 at each computer system and/or at the management framework. As the usage units near expiration, the hypervisor can, for example, signal that a particular image instance is about to become unlicensed. The management framework can then either allocate more usage units, shut down the image instance, or audit any unlicensed usage for subsequent end-user charging or other form of compensation.

Appliance Builder

Figure 2:
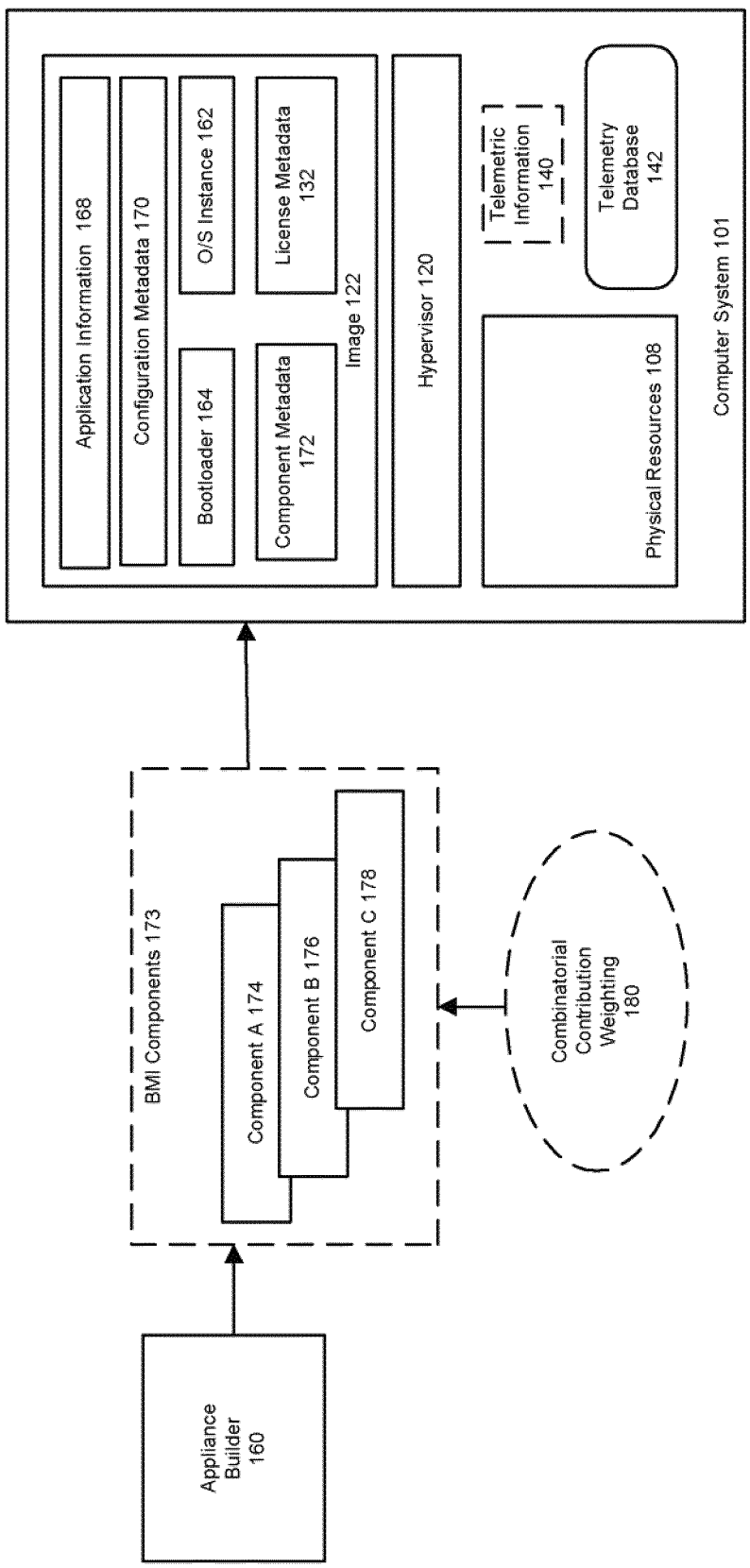
FIG. 2 shows an illustration of how an appliance builder can be used to provide component information and usage-based licensing metadata in a bootable machine image, in accordance with an embodiment.

FIG. 2 shows an illustration of how an appliance builder can be used to provide component information and usage-based licensing metadata in a bootable machine image, in accordance with an embodiment. As described above, in accordance with an embodiment, a plurality of guest O/S images can be packaged and deployed as a bootable machine image (BMI) to be executed on the hypervisor, wherein the hypervisor then multiplexes the physical server resources as per configured resource usage parameters and/or policies to each image or BMI executing upon it at any given time. The set of BMI's deployed to, and executing on, a particular hypervisor/server tuple is dynamic and can change over time. As shown in FIG. 2, in accordance with an embodiment, an appliance builder tool 160 can be provided, for example as part of a virtualization product suite, and can be used for packaging a BMI 122, including a chosen guest O/S 162, bootloader 164, middleware and applications 168, configuration metadata 170, and any other required components, into the appropriate BMI format to enable the target hypervisor to load and execute its contents.

In accordance with an embodiment, each guest image O/S includes an operating system that is either capable of, or modified to, execute on a particular hypervisor abstraction layer API. Examples of such O/S include Linux, UNIX variants, Windows and MacOS. In addition to the traditional O/S technologies described above, other guest runtimes can be hosted by a particular hypervisor, including, for example, a Java Virtual Machine that is modified to run directly upon a hypervisor, instead of in its normal mode of execution as an application on a target O/S.

In accordance with an embodiment, the BMI is provided in a file format that is known to its associated hypervisor, and which encapsulates an instance of a supported guest O/S, middleware, end-user applications, and associated configuration metadata artifacts, and which in turn enables the hypervisor to load and execute the guest O/S and the applications therein. The BMI can be provided as, or can include, a disk filesystem representation of the guest O/S, applications and configuration information, which enables the guest O/S to boot transparently with respect to the presence of the hypervisor.

During assembly of a particular BMI instance, the appliance builder can insert component metadata 172 into the BMI, which identifies the components 173 in the BMI, here illustrated as components A through C 174, 176, 178, which are to be usage-licensed. In accordance with an embodiment, this can be performed by including a signed metadata file in the virtual disk filesystem or image. The metadata can then be used by either the hypervisor and/or the management framework to calculate and apply usage units to the components therein.

In accordance with some embodiments, particularly those that package assemblies of a plurality of BMI's to form composite applications, a combinatorial contribution weighting 180 can be used to provide component weighting. The combinatorial contribution weighting feature is described in further detail below with regard to image assemblies.

Since the hypervisor generally has no knowledge of the guest O/S internals and/or the applications executing therein, unless it has been provided with knowledge of the guest O/S implementation, with which it could inspect it's data structures to extract usage information, the hypervisor similarly has no insight into the individual components/processes that compose the BMI. Accordingly, in accordance with an embodiment, the hypervisor instruments the BMI usage as a form of "black box", i.e. the resources consumed by each image instance are determined macroscopically over the entire image instance and the components running therein. The resources consumed by the individual application components executing in the guest O/S on the hypervisor are not themselves determinable without intrusive changes to either the guest O/S and/or the applications themselves.

Management Framework

Figure 3:
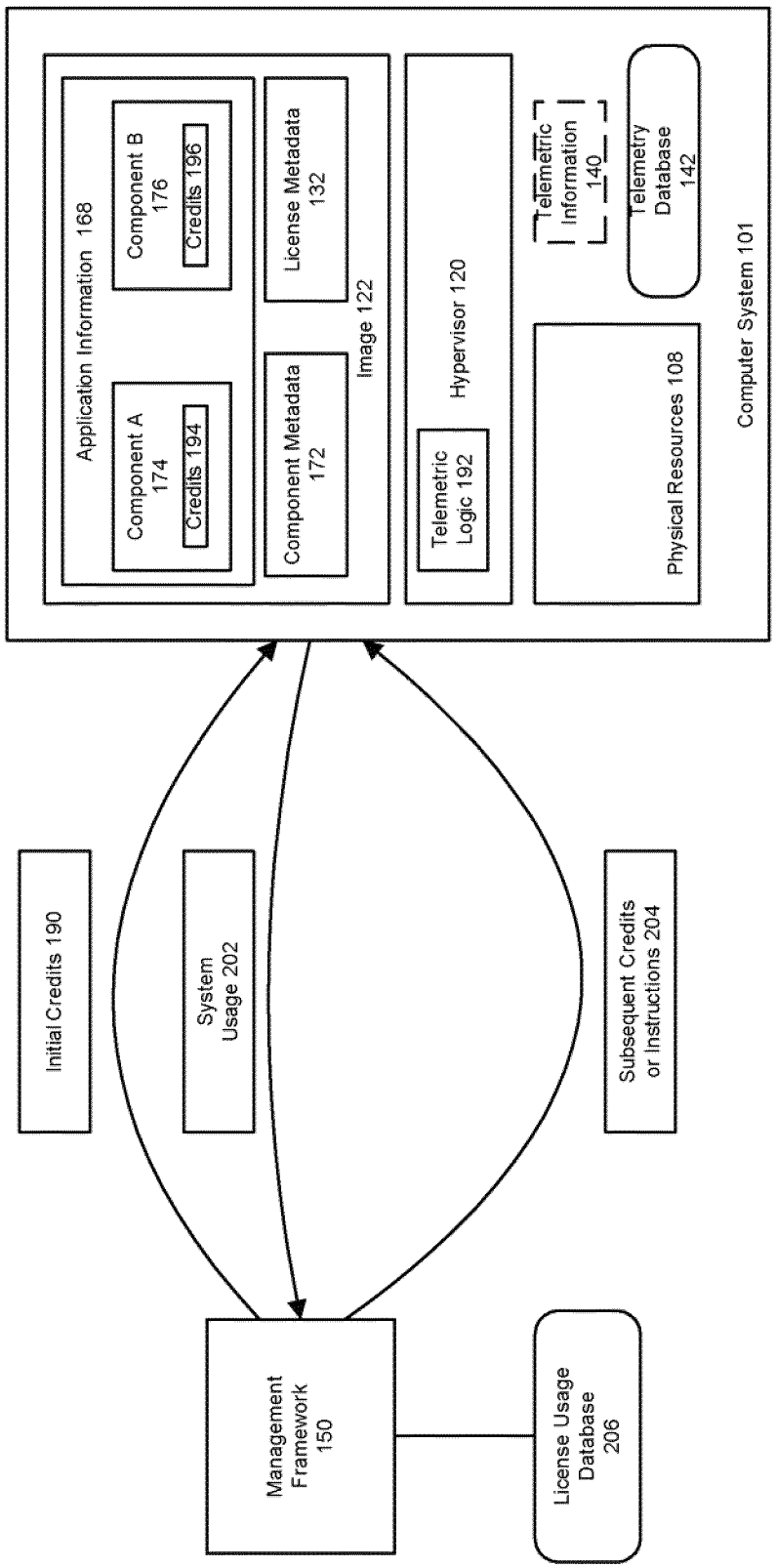
FIG. 3 shows an illustration of the use of a management framework with usage-based licensing, in accordance with an embodiment.

FIG. 3 shows an illustration of the use of a management framework with usage-based licensing, in accordance with an embodiment. As described above, in accordance with an embodiment, the hypervisor reports the telemetric information or statistics, either continuously, upon request, or at image shutdown/termination, to a management framework; and the management framework then uses the statistics to ensure the system is adequately licensed with usage units and/or to provide a means of charging end-users for their usage. In this manner, the management framework is responsible for the lifecycle management of one or more physical servers which have been virtualized by running an instance of their associated hypervisor. The management framework can be provided as a command and control framework, including a management console user interface (UI), that allows individual hypervisor instances managed by the framework to be loaded, started, suspended, restarted, configured, etc., and which also allows for management of target BMI instances across a managed domain of servers, such as a virtual execution environment, or cloud.

In accordance with an embodiment, the management framework is also responsible for extracting the telemetric information or statistics from each of the individual hypervisors, for the BMI instances executing on those hypervisors, and then logging those statistics to a persistence log and/or to the management console at the management framework and/or a computer system within the virtualizaed environment.

As shown in FIG. 3, the management framework is able to provide initial usage credits 190 to be associated with each BMI. A telemetric logic 192 at the hypervisor associates initial credits 194, 196 with each of the instances running on that hypervisor. The management framework can then proactively or dynamically consume non-repudiatable usage statistics 202 for multiple BMI instances from their managed domain of hypervisors, and securely audit the usage of the licensable components within each BMI instance. For example, the management framework can dynamically respond with additional "usage" credits 204 or other instructions to a particular hosting hypervisor or upon termination of a particular instance. The management framework secures the usage information in a fashion that will allow a vendor to subsequently extract usage statistics as appropriate for their licensed components in a license usage database 206.

In accordance with an embodiment, the management framework uses the metadata information previously embedded by the BMI appliance builder into a particular BMI instance in order to determine which licensable components are contained therein, and if necessary the relative weight or contribution those components contribute to the overall usage of hypervisor resources during the execution lifecycle of an instance of that BMI.

Figure 4:
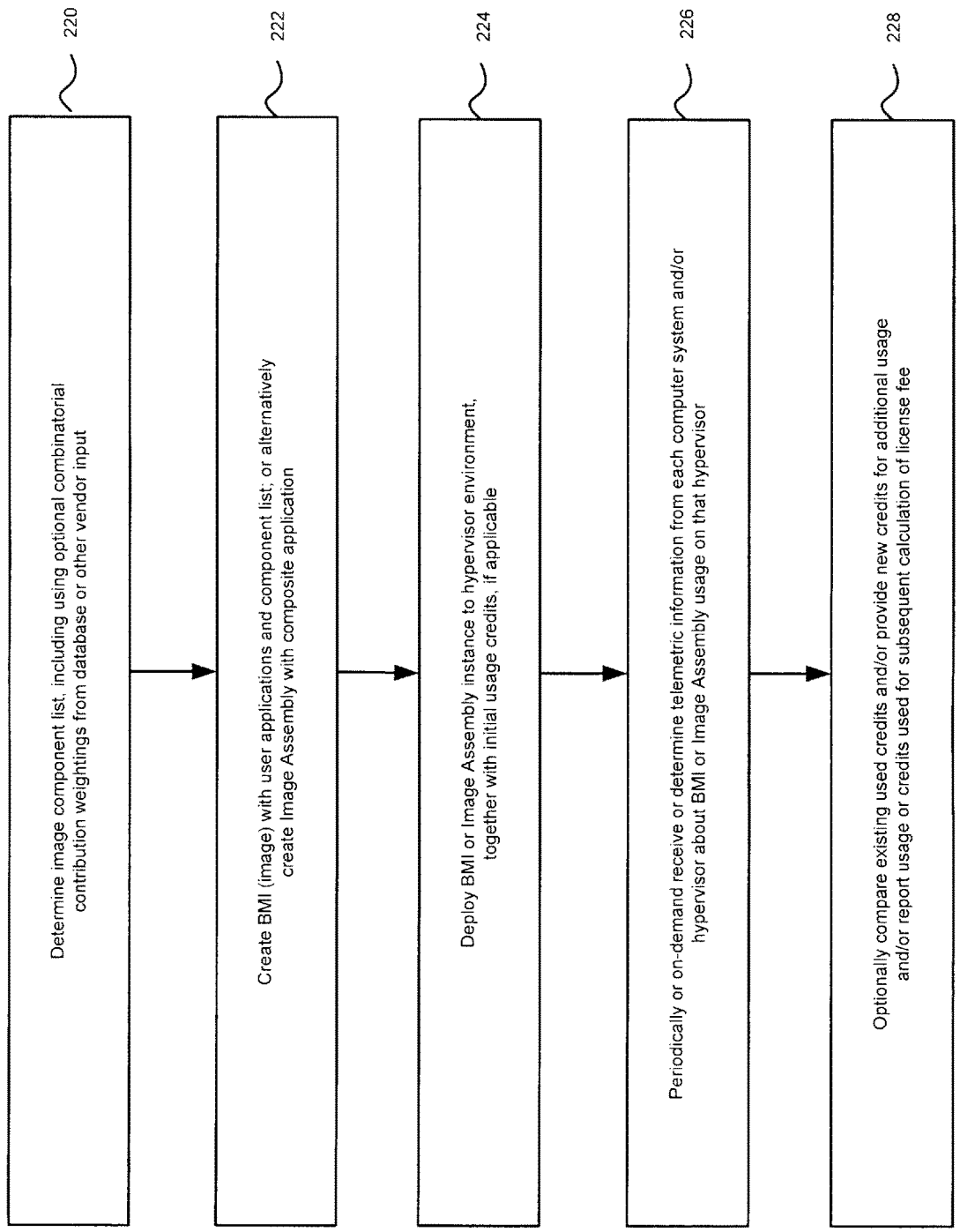
FIG. 4 shows a flowchart of a method for providing usage-based licensing in a hypervisor virtual execution environment in accordance with an embodiment.
Figure 5:
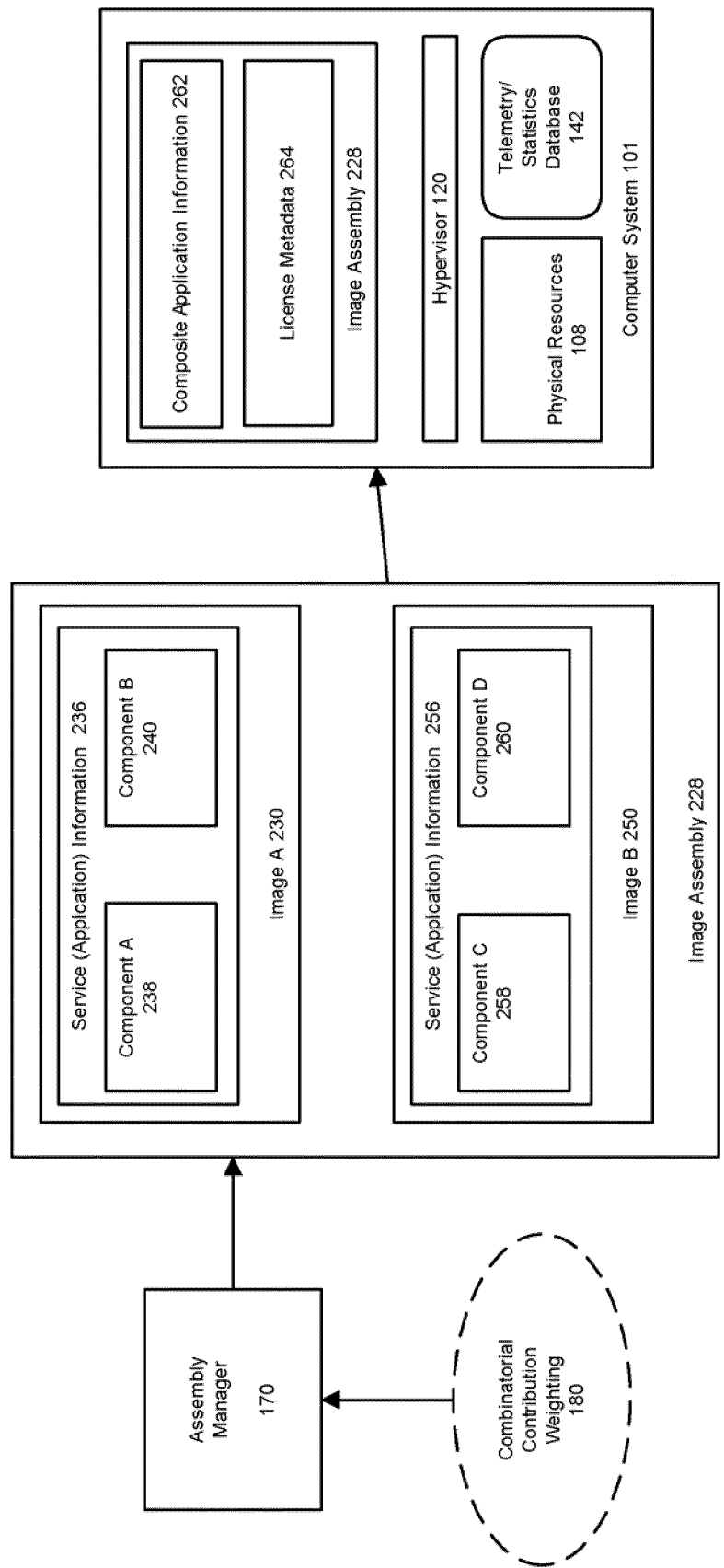
FIG. 5 shows an example of an illustration of how the system can be used to provide component information and usage-based licensing metadata in a BMI assembly, in accordance with an embodiment.

FIG. 4 shows a flowchart of a method for providing usage-based licensing in a hypervisor virtual execution environment in accordance with an embodiment. As shown in FIG. 4, in step 220, an image component list is determined, including using optional combinatorial contribution weightings from an appropriate database or vendor input. In step 222, a bootable machine image is created, with user applications and component list; or alternatively an image assembly is created with a composite application. In step 224, the BMI or image assembly is deployed as an instance to a hypervisor environment, together with initial usage credits, if applicable. In step 226 the management framework periodically or on-demand receives or determines telemetric information from each computer system and/or hypervisor about the BMI or image assembly usage on that hypervisor. In step 228, the management framework and hypervisor optionally compare existing used credits and/or provide new credits for additional usage, and/or report usage or credits used for subsequent calculation of license fee, Assembly Manager FIG. 5 shows an example of an illustration of how the system can be used to provide component information and usage-based licensing metadata for a BMI assembly, in accordance with an embodiment. As described above, in accordance with an embodiment, the system can comprise an assembly manager 170, which can be provided as a virtual assembly management framework, tool, console, with associated user interface (UI). In the context of Service Oriented Architecture (SOA), applications are often composite applications, or composites, i.e. applications that appear as single applications from an end-user perspective, but which are actually composed of multiple parts or services. Each service is a distinct component, that may be implemented on a variety of middleware technologies, and hosted in their respective (unique) runtime containers, or environments. In virtualized SOA deployments, it is desirable to operate on virtual composite applications as single, indivisible components, as a whole, during their operational lifecycle. Individual services or components, along with their associated runtime environments, configuration metadata artifacts, and other related data can be packaged (via an appliance tool) into individual BMI (file).

As shown in FIG. 5, in accordance with an embodiment, once each service 236, 256, is packaged in its own BMI 230, 250, together with any components therein, an image assembly 228 of each BMI "appliance" is constructed using the assembly manager tool, which creates a single image containing each component BMI, and also specifies any initial useage license metadata 264 and other metadata artifacts required to describe the assembled composite application 262. The image assembly can then be deployed to a hypervisor in the virtual execution environment.

In accordance with an embodiment, in order to accommodate the licensing of "composite" BMI assemblies (i.e. BMIs that contain a plurality of licensable components) without the hypervisor having knowledge of, and inspecting the internals thereof, the target guest O/Ss, a "combinatorial contribution weighting" scheme 180 can be used. Combinatorial contribution weighting allows the system to distribute/attribute resources consumed by a composite BMI across the licensable components therein. When assembling either an individual BMI using the appliance builder, or assembling one or more BMIs into a composite application assembly using the assembly manager, the management framework can incorporate weightings for each licensable component therein in a secure, non-repudiatable fashion, for subsequent use by the licensing system. These weightings can be assigned by the vendor for each individual licensable component (for example, in a secure license store), and can be calculated in conjunction with other licensable components combined within an individual BMI, or a composite application comprising a plurality of BMI's.

Telemetric Information

As described above, in accordance with an embodiment, the hypervisor at each computer system collects telemetric information, or otherwise aggregates statistics regarding the usage by each particular image instance on that computer system for that system's physical resources over the lifecycle of that particular image instance. This telemetric information can be either accessed remotely via the network, or collected in some persistent form (for example, a local/remote disk) for later analysis. Some hypervisors may be "transparent" with respect to the hosted/guest O/S and applications running thereon; while others may require additional integration with their supported "guest" operating system(s) and/or offer APIs to applications to integrate closer with the hosting hypervisor platforms. Such additional application level integration typically provides management and telemetry facilities to applications, while O/S level integration is usually a result of choices made by the hypervisor architecture and implementation effecting the interfaces between a particular guest O/S and the hardware device/system interfaces that the hypervisor virtualizes.

As described above, in accordance with an embodiment, the hypervisor aggregates (in real time) per BMI instance usage over the lifecycle (start-finish) of a particular image instance, and reports those, either continuously, by request, or at image shutdown/termination, to the management framework, in some instances in a format that is non-repudiatable and recorded in the BMI (for example, at shutdown, as an encrypted file format). Examples of the statistics that can be tracked include: actual CPU (seconds) consumed from startup, timestamped; average memory consumed since startup, timestamped; total I/O operations since startup, timestamped; total network I/O since startup, timestamped.

The telemtric information allows per-BMI usage to be calculated either retro-actively, or pro-actively by the licensing component of the management framework, and enables, for example: a retroactive audit based usage licensing model; a proactive, dynamic, "pay-as-you-go" model, where usage information is exchanged from the hypervisor, with the management framework which in turn responds with additional usage "credits" to be applied by the hypervisor towards the resources consumed by a particular BMI instance; a proactive, static, initial allocation of usage units, recorded in the BMI (by the licensing component of the management framework) and accessed during execution, by the hypervisor. At expiry, or a designated "low watermark" the hypervisor can signal the licensing component that a particular BMI is about to become unlicensed (by using all of its allocation) and the management framework can either allocate more, shut down the BMI, or audit the unlicensed usage for later compensation.

In certain environments, such as the case where a Java Virtual Machine (JVM) has been modified to run directly upon a hypervisor, as opposed to their normal mode of execution as an application of a "guest" O/S, the runtime of the JVM can be modified with a telemetric logic, to be aware of telemetry capabilities and associated APIs in the hosting hypervisor and its management infrastructure; in such cases, the JVM could provide additional "real time" telemetry to the hypervisor with respect to the Java middleware and applications running therein, and their resource consumption. This additional telemetry allows the usage based licensing to provide greater fidelity of usage reporting for the purposes of licensing.

Illustrative Example

Figure 6:
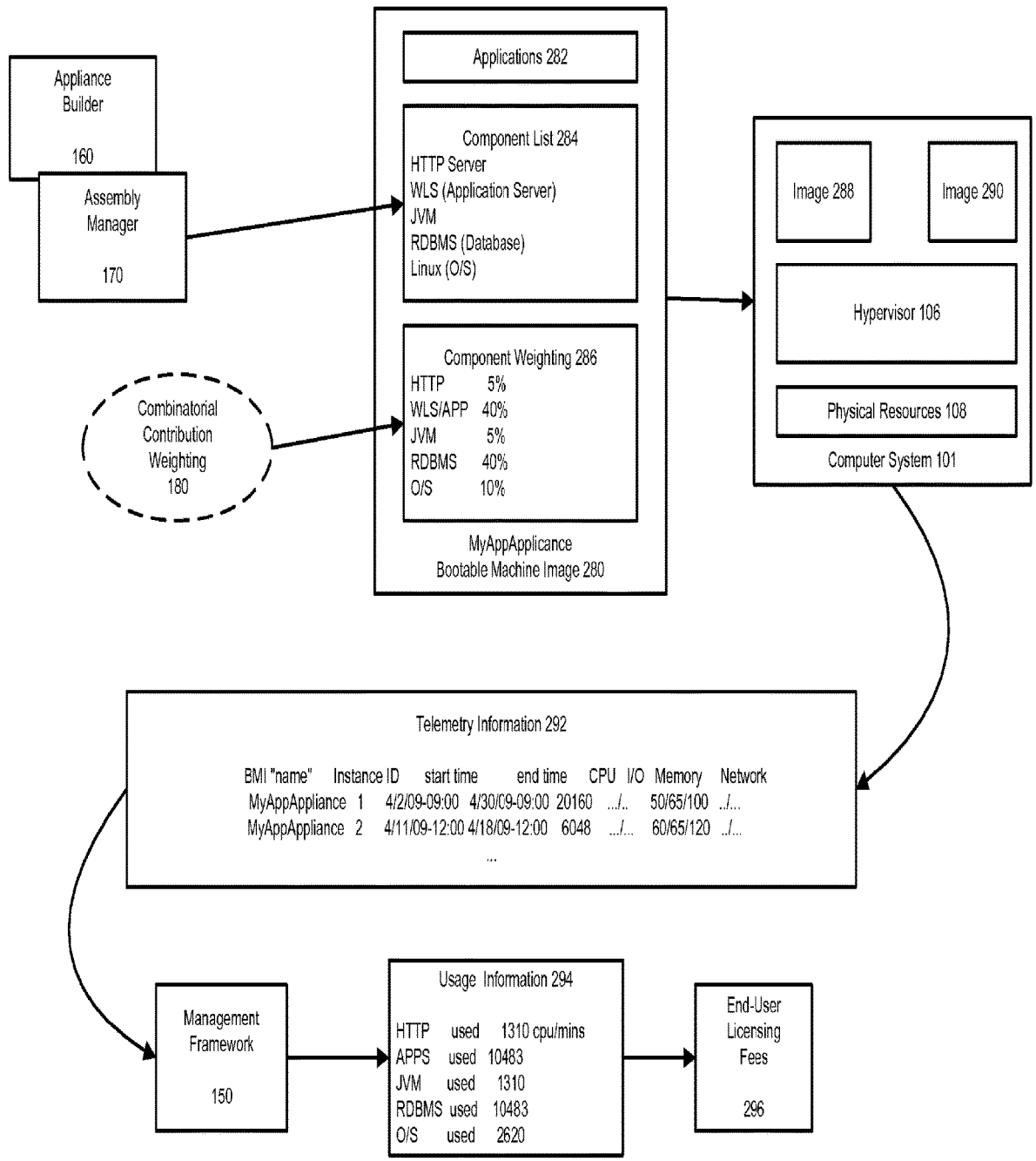
FIG. 6 shows an example of the provisioning and utilization of usage-based licensing, in accordance with an embodiment.

FIG. 6 shows an example of the provisioning and utilization of usage-based licensing, in accordance with an embodiment. As shown in FIG. 6, in this particular example, a customer deploying a virtual execution environment which includes a hypervisor may want to construct an application appliance from the following components:
(a) a HTTP Server;
(b) an Application Server (e.g. WebLogic or WLS);
(c) a JVM;
(d) a relational database (RDBMS); and
(e) an operating system (O/S, e.g. Linux).
and further include some mid-tier application code (for example, in WebLogic). Using either the appliance builder and assembly manager they construct a BMI of these components, their application, and any configuration metadata artifacts, and name this image "MyAppApplicance" 280.

In the process of assembling the image, the assembly manager creates an artifact that contains the list of licensable components above, together with their associated "combinatorial contribution weighting". Interrogating the Combinatorial Contribution Weighting database, the assembly tool assembles the BMI image and the licensing artifact containing the list of components and their weightings, which in this example may be:

| | |
|---|---|
| (a) HTTP Server | 5% |
| (b) Application Server (WLS) | 40% (including user application code) |
| (c) JVM | 5% |
| (d) Relational Database (RDBMS) | 40% |
| (e) Operating System (O/S) | 10% |

The end-user deploys instances of this BMI 288, 290 onto their server farm, virtual execution environment, or cloud, and runs their application.

In this example, they have chosen the option to be billed monthly in arrears by the vendor for their usage. Telemetric information or statistics 292 show that over the last month they have started and stopped multiple instance of the "MyAppApplicance" BMI on multiple servers. The hypervisors have continually gathered and reported CPU, I/O, memory and network statistics for each instance lifecycle, and the management framework has logged those accordingly. The (non-repudiatable) log might look something like that shown in FIG. 6. At the end of a 30 day period, the management framework can sum this usage information 294 accordingly. In this example, it seems that "MyAppAppliance" has used a total of 26208 CPU minutes of resource. Assume Oracle's current usage licensing only licenses on CPU usage. The licensing framework the applied the combinatorial contribution weightings of the licensed component to this total CPU usage

| | |
|---|---|
| (a) HTTP Server used | 1310 cpu/mins |
| (b) Application Server (WLS) used | 10483 |
| (c) JVM used | 1310 |
| (d) Relational Database (RDBMS) used | 10483 |
| (e) Operating System (O/S) used | 2620 |

The vendor can then apply their current price/usage unit fees and any volume or combination discounts etc to charge the end-user a corresponding license fee 296.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for usage-based application licensing in a hypervisor virtual execution environment, comprising:
   a physical computer having resources including at least one processor and memory, and further including one or more hypervisors that virtualize the resources of the physical computer;
   an appliance builder for use in creating bootable machine images and for deployment of the bootable machine images as image instances to execute upon the one or more hypervisors of the physical computer in the virtual execution environment,
      wherein each bootable machine image and image instance thereof includes a filesystem representation of a guest operating system, and an assembly of a plurality of licensable application and other components and configuration information associated therewith;
      wherein the appliance builder determines the plurality of licensable application and other components to be used to create each of the bootable machine images, and embeds, into the bootable machine image:
         a component metadata that identifies each of the plurality of licensable components of said bootable machine image which are to be usage-licensed, together with
         a combinatorial contribution weighting data defining weightings for the plurality of licensable components in the bootable machine image; and
   a management framework which:
   associates each image instance, of a plurality of image instances with an initial allocation of usage units; and
   receives, upon execution of the plurality of image instances, an aggregate telemetric information from each of the one or more hypervisors describing aggregate usage by each image instance of the computer resources virtualized by that hypervisor;
      wherein the usage units for a particular image instance are accessed during execution of that instance by the hypervisor, and the telemetric information describing usage by the particular image instance is recorded in a telemetry database;
      wherein, as usage units associated with particular image instances are used, the hypervisor signals such usage to the management framework;
   wherein the management framework, in response to receiving the telemetric information associated with the execution of the plurality of image instances, describing the aggregate usage by each particular image instance over the lifecycle of that image instance, uses the component metadata and combinatorial contribution weighting data embedded within each bootable machine image to record usage by each licensable application and other component identified by the metadata therein, including:
      determining overall usage by the image instance as modified by the combinatorial contribution weighting, to attribute resources consumed by the particular image instance across the licensable components included therein; and
      recording a usage of computer resources by each licensable component of the image instance, for licensing the usage of each of the plurality of licensable components.

2. The system of claim 1, wherein the appliance builder or management framework assigns initial usage credits to each image instance, and subsequently assigns additional usage credits or further instructions while the image instances are running.

3. The system of claim 2, wherein the further instructions include a request to terminate execution of an instance when the usage credits associated with the instance have been exceeded.

4. The system of claim 1, wherein the telemetric information is used to determine a license fee covering the usage by the image instances at those hypervisors of the computer resources virtualized by those hypervisors.

5. The system of claim 1, wherein the system further comprises:
an assembly manager process, for use in creating bootable machine image assemblies of composite applications, for deployment of the image assemblies as image instances to execute upon the one or more hypervisors in the virtual execution environment.

6. The system of claim 1, wherein usage by each licensable component is determined by modifying the usage of computer resources by the entire image instance based on combinatorial contribution weighting data generated using the component metadata, which combinatorial contribution weighting data defining weightings for the plurality of licensable components in the particular bootable machine image.

7. The system of claim 6, wherein the management framework determines and reports resource consumption associated with each licensable component and a licensing fee is generated by a licensor based on the resource consumption of the licensable component associated with the licensor and a fee schedule and any volume or combination discounts associated with the licensable component.

8. A method for usage-based application licensing in a hypervisor virtual execution environment, comprising:
providing a physical computer having resources including at least one processor and memory, and further including one or more hypervisors that virtualize the resources of the physical computer;
providing an appliance builder for use in creating bootable machine images and for deployment of the bootable machine images as image instances to execute upon the one or more hypervisors of the physical computer in the virtual execution environment,
wherein each bootable machine image and image instance thereof includes a filesystem representation of a guest operating system, and an assembly of a plurality of licensable application and other components and configuration information associated therewith;
wherein the appliance builder determines the plurality of licensable application and other components to be used to create each of the bootable machine images, and embeds, into the bootable machine image:
a component metadata that identifies each of the plurality of licensable components of said bootable machine image which are to be usage-licensed, together with
a combinatorial contribution weighting data defining weightings for the plurality of licensable components in the bootable machine image; and
providing a management framework which:
associates each image instance, of a plurality of image instances with an initial allocation of usage units; and
receives, upon execution of the plurality of image instances, an aggregate telemetric information from each of the one or more hypervisors describing usage by each image instance of the computer resources virtualized by that hypervisor;
wherein the usage units for a particular image instance are accessed during execution of that instance by the hypervisor, and the telemetric information describing usage by the particular image instance is recorded in a telemetry database;
wherein, as usage units associated with particular image instances are used, the hypervisor signals such usage to the management framework; and
wherein the management framework, in response to receiving the telemetric information associated with the execution of the plurality of image instances, describing the aggregate usage by each particular image instance over the lifecycle of that image instance, uses the component metadata and combinatorial contribution weighting data embedded within each bootable machine image to record usage by each licensable application and other component identified by the metadata therein, including:
determining overall usage by the image instance as modified by the combinatorial contribution weighting, to attribute resources consumed by the particular image instance across the licensable components included therein; and
recording a usage of computer resources by each licensable component of the image instance, for licensing the usage of each of the plurality of licensable components.

9. The method of claim 8, wherein the appliance builder or management framework assigns initial usage credits to each image instance, and subsequently assigns additional usage credits or further instructions while the image instances are running.

10. The method of claim 9, wherein the further instructions can include a request to terminate execution of an instance if usage credit has been exceeded.

11. The method of claim 8, wherein the telemetric information is used to determine a license fee covering the usage by the image instances at those hypervisors of the computer resources virtualized by those hypervisors.

12. The method of claim 8, wherein the method further comprises:
providing an assembly manager, for use in creating bootable machine image assemblies of composite applications, for deployment of the image assemblies as image instances to execute upon the one or more hypervisors in the virtual execution environment or cloud.

13. The method of claim 8, wherein the management framework usage by each licensable component is determined by modifying the usage of computer resources by the entire image instance based on combinatorial contribution weighting data generated using the component metadata, which combinatorial contribution weighting data defining weightings for the plurality of licensable components in the particular bootable machine image.

14. A non-transitory computer-readable storage medium, including instructions stored thereon, which when read and executed by a physical computer having resources including at least one processor and memory, further including one or more hypervisors that virtualize the resources of the physical computer, cause the physical computer to perform the steps comprising:
providing an appliance builder for use in creating bootable machine images and for deployment of the bootable machine images as image instances to execute upon the one or more hypervisors of the physical computer in the virtual execution environment, wherein each bootable machine image and image instance thereof includes a filesystem representation of a guest operating system, and an assembly of a plurality of licensable application and other components and configuration information associated therewith;

wherein the appliance builder determines the plurality of licensable application and other components to be used to create each of the bootable machine images, and embeds, into the bootable machine image:
  a component metadata that identifies each of the plurality of licensable components of said bootable machine image which are to be usage-licensed, together with
  a combinatorial contribution weighting data defining weightings for the plurality of licensable components in the bootable machine image; and providing a management framework which:

associates each image instance, of a plurality of image instances with an initial allocation of usage units; and receives, upon execution of the plurality of image instances, an aggregate telemetric information from each of the one or more hypervisors describing usage by each image instance of the computer resources virtualized by that hypervisor;

wherein the usage units for a particular image instance are accessed during execution of that instance by the hypervisor, and the telemetric information describing usage by the particular image instance is recorded in a telemetry database;

wherein, as usage units associated with particular image instances are used, the hypervisor signals such usage to the management framework; and wherein the management framework, in response to receiving the telemetric information associated with the execution of the plurality of image instances, describing the aggregate usage by each particular image instance over the lifecycle of that image instance, uses the component metadata and combinatorial contribution weighting data embedded within each bootable machine image to record usage by each licensable application and other component identified by the metadata therein, including:
  determining overall usage by the image instance as modified by the combinatorial contribution weighting, to attribute resources consumed by the particular image instance across the licensable components included therein; and
  recording a usage of computer resources by each licensable component of the image instance, for licensing the usage of each of the plurality of licensable components.

15. The non-transitory computer-readable storage medium of claim 14, wherein the appliance builder or management framework assigns initial usage credits to each image instance, and subsequently assigns additional usage credits or further instructions while the instances are running.

16. The non-transitory computer-readable storage medium of claim 15, wherein the further instructions can include a request to terminate execution of an instance if usage credit has been exceeded.

17. The non-transitory computer-readable storage medium of claim 14, wherein the telemetric information is used to determine a license fee covering the usage by the image instances at those hypervisors of the computer resources virtualized by those hypervisors.

18. The non-transitory computer-readable storage medium of claim 14, wherein the instructions further comprise:
  providing an assembly manager, for use in creating bootable machine image assemblies of composite applications, for deployment of the image assemblies as image instances to execute upon the one or more hypervisors in the virtual execution environment or cloud.

19. A system for usage-based application licensing in a hypervisor virtual execution environment, comprising:
  a physical computer having resources including at least one processor and memory, and further including one or more hypervisors that virtualize the resources of the physical computer;
  an appliance builder for use in creating bootable machine images for deployment of the bootable machine images as image instances to execute upon the one or more hypervisors of the physical computer in the virtual execution environment,
  wherein each bootable machine image and image instance thereof includes a guest operating system, and a plurality of licensable application and other components and configuration information associated therewith;
  wherein the appliance builder determines the plurality of licensable application and other components used to create the bootable machine image, and embeds, into the bootable machine image:
    a component metadata that identifies each of the plurality of licensable components of said bootable machine image which are to be usage-licensed, together with
    a combinatorial contribution weighting data defining weightings for the plurality of licensable components in the bootable machine image; and
  a management framework which:
    receives, upon execution of the plurality of image instances, a telemetric information from each of the one or more hypervisors describing aggregate usage by each particular image instance of the computer resources virtualized by that hypervisor; and
    in response to receiving the telemetric information associated with the execution of the plurality of image instances, describing the aggregate usage by each particular image instance over the lifecycle of that image instance, uses the component metadata and combinatorial contribution weighting data embedded within each bootable machine image to record usage by each licensable application and other component identified by the metadata therein, including:
      determining overall usage by the image instance as modified by the combinatorial contribution weighting, to attribute resources consumed by the particular image instance across the licensable components included therein; and
      recording a usage of computer resources by each licensable component of the image instance, for licensing the usage of each of the plurality of licensable components.

20. A method for usage-based application licensing in a hypervisor virtual execution environment, comprising:
  providing a physical computer having resources including at least one processor and memory, and further including one or more hypervisors that virtualize the resources of the physical computer;

creating bootable machine images for deployment of the bootable machine images as image instances to execute upon the one or more hypervisors of the physical computer in the virtual execution environment, wherein each bootable machine image and image instance thereof includes a guest operating system, and a plurality of licensable application and other components and configuration information associated therewith;

determining the plurality of licensable application and other components used to create the bootable machine image, and embedding, into the bootable machine image:
- a component metadata that identifies each of the plurality of licensable components of said bootable machine image which are to be usage-licensed, together with
- a combinatorial contribution weighting data defining weightings for the plurality of licensable components in the bootable machine image;

receiving, upon execution of the plurality of image instances, a telemetric information from each of the one or more hypervisors describing aggregate usage by each particular image instance of the computer resources virtualized by that hypervisor; and in response to receiving the telemetric information associated with the execution of the plurality of image instances, describing the aggregate usage by each particular image instance over the lifecycle of that image instance, using the component metadata and combinatorial contribution weighting data embedded within each bootable machine image to record usage by each licensable application and other component identified by the metadata therein, including:

determining overall usage by the image instance as modified by the combinatorial contribution weighting, to attribute resources consumed by the particular image instance across the licensable components included therein; and recording a usage of computer resources by each licensable component of the image instance, for licensing the usage of each of the plurality of licensable components.

\* \* \* \* \*

UNITED STATES PATENT AND TRADEMARK OFFICE
CERTIFICATE OF CORRECTION

PATENT NO. : 11,132,237 B2  
APPLICATION NO. : 12/566380  
DATED : September 28, 2021  
INVENTOR(S) : Cable et al.

Page 1 of 2

It is certified that error appears in the above-identified patent and that said Letters Patent is hereby corrected as shown below:

On the Title Page

On page 2, Column 2, under Other Publications, Line 11, delete ""?id= 1555278," and insert -- ?id=1555278, --, therefor.

On page 2, Column 2, under Other Publications, Line 20, delete "Intellecutual" and insert -- Intellectual --, therefor.

On page 2, Column 2, under Other Publications, Line 20, delete "Repulic" and insert -- Republic --, therefor.

In the Drawings

On sheet 5 of 6, in FIGURE 5, under Reference Numeral 236, Line 1, delete "(Applcation)" and insert -- (Application) --, therefor.

On sheet 5 of 6, in FIGURE 5, under Reference Numeral 256, Line 1, delete "(Applcation)" and insert -- (Application) --, therefor.

In the Specification

In Column 4, Line 19, delete "partical" and insert -- particular --, therefor.

In Column 5, Line 66, delete "virtualizaed" and insert -- virtualized --, therefor.

In Column 6, Line 44, delete "fee," and insert -- fee. --, therefor.

In Column 7, Line 7, delete "useage" and insert -- usage --, therefor.

In Column 7, Line 65, delete "telemtric" and insert -- telemetric --, therefor.

Signed and Sealed this  
Seventh Day of November, 2023

Katherine Kelly Vidal  
*Director of the United States Patent and Trademark Office*

In Column 8, Line 43, delete "Linux)." and insert -- Linux); --, therefor.

In Column 8, Line 48, delete "MyAppApplicance" and insert -- MyAppAppliance --, therefor.

In Column 9, Line 5, delete "MyAppApplicance" and insert -- MyAppAppliance --, therefor.

In Column 9, Line 16, delete "the applied" and insert -- then applies --, therefor.